United States Patent [19]

Matsui et al.

[11] Patent Number: 5,004,902
[45] Date of Patent: Apr. 2, 1991

[54] FOCUSED POINT DETECTING OPTICAL SYSTEM

[75] Inventors: Hiroshi Matsui, Hino; Akitoshi Toda, Kunitachi, both of Japan

[73] Assignee: Olympus Optical Co., Ltd., Tokyo, Japan

[21] Appl. No.: 300,598

[22] Filed: Jan. 23, 1989

[30] Foreign Application Priority Data

Jan. 22, 1988 [JP] Japan .................................. 63-11982

[51] Int. Cl.$^5$ ............................ G01J 1/20; H01J 3/14; G02F 1/13; G03B 3/00
[52] U.S. Cl. .................................. 250/201.8; 250/216; 350/331 R; 350/347 V; 354/406; 354/407; 354/408
[58] Field of Search ............... 350/332, 347 R, 347 V, 350/331 R; 354/406, 407, 408, 402; 250/201.6, 201.8, 216

[56] References Cited

U.S. PATENT DOCUMENTS

| | | | |
|---|---|---|---|
| 4,029,393 | 6/1977 | Dungan et al. | 350/331 R |
| 4,190,343 | 2/1980 | Wagensonner | 350/331 R |
| 4,641,922 | 2/1987 | Jacob | 350/331 R |
| 4,721,975 | 1/1988 | Hamada | 354/408 |
| 4,728,785 | 3/1988 | Ohnuki et al. | 354/408 |
| 4,729,641 | 3/1988 | Matsuoka et al. | 350/347 V X |
| 4,743,932 | 5/1988 | Matsui | 354/407 |
| 4,794,416 | 12/1988 | Mukai et al. | 354/406 |
| 4,849,782 | 7/1989 | Koyama et al. | 354/408 |
| 4,855,777 | 8/1989 | Suda et al. | 354/402 |

FOREIGN PATENT DOCUMENTS 55-143404  11/1980  Japan .

Primary Examiner—Stanley D. Miller
Assistant Examiner—Anita Pellman Gross
Attorney, Agent, or Firm—Cushman, Darby & Cushman

[57] ABSTRACT

The focussed point detecting optical system comprises an objective lens, a pair of reimaging lenses arranged on the side opposite to the objective lens at a location apart from the imaging plane of the objective lens, and a variable refractive index optical element arranged in the vicinity of said imaging plane so as to have, as a plane of symmetry, the plane including the optical axis of the objective lens and perpendicular to the straight line passing through the centers of said pair of reimaging lenses. This focussed point detecting optical system permits changing base length and is capable of favorably detecting focussed points of lenses having various F number. The variable refractive index optical element is a liquid crystal prism so composed as to permit varying voltage to be applied.

14 Claims, 2 Drawing Sheets

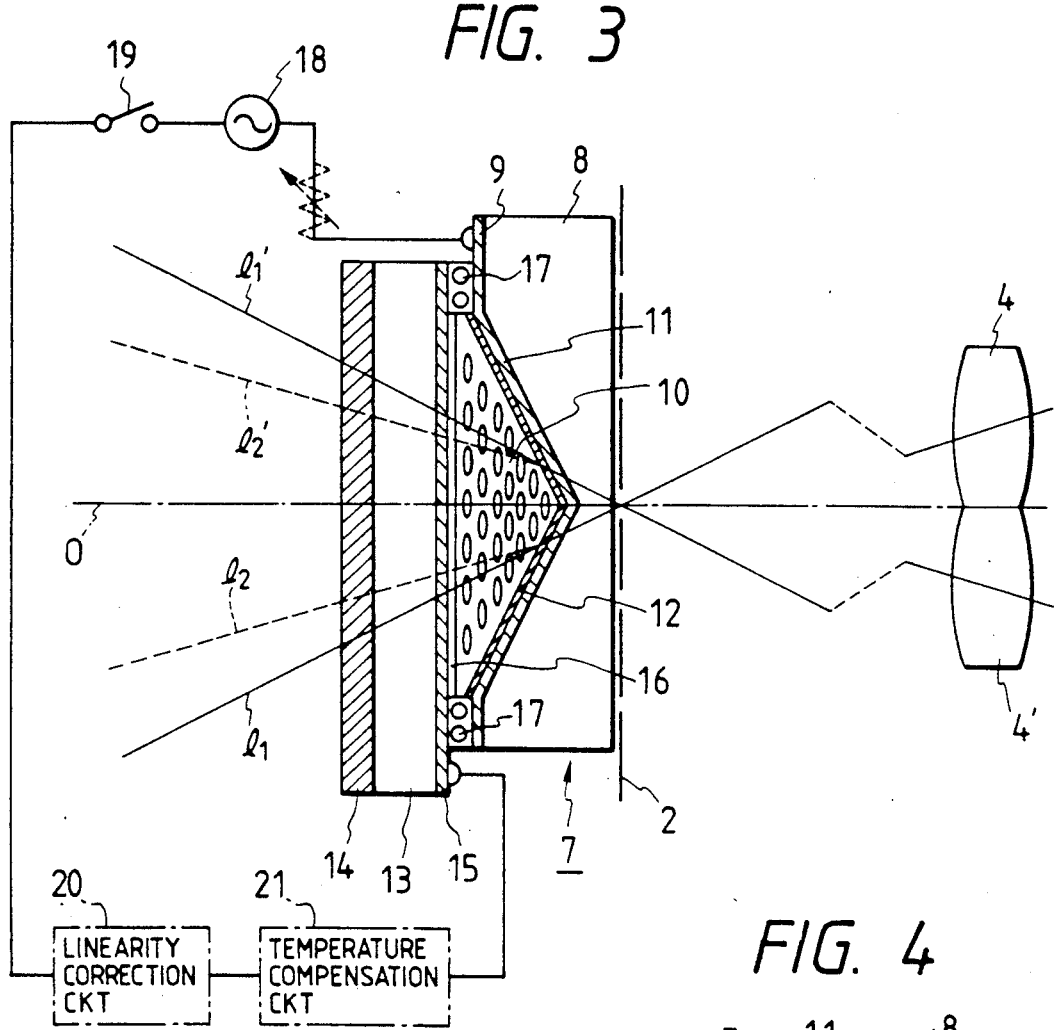
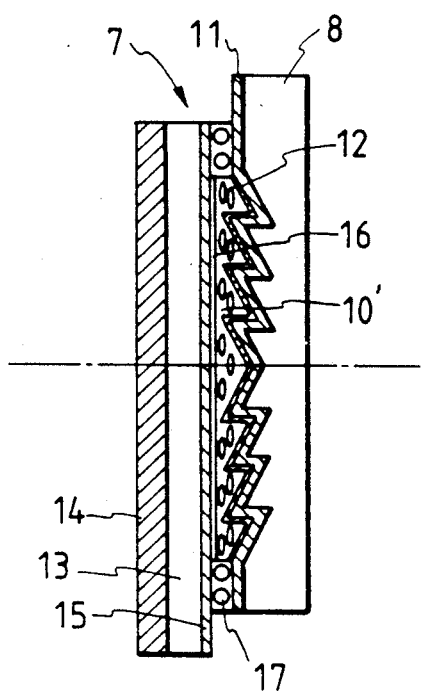

FOCUSED POINT DETECTING OPTICAL SYSTEM

BACKGROUND OF THE INVENTION (a) Field of the Invention:

The present invention relates to a focussed point detecting optical system to be used in various kinds of optical instruments.

(b) Description of the Prior Art:

In the recent years, cameras widely adopt the automatic focus detecting devices for practical use, most of which are designed on the principle of so-called triangulation.

FIG. 1 shows a schematic diagram illustrating an example of the optical systems for the automatic focus detecting devices. In this drawing, the reference numeral 1 represents a photographic lens of a camera and the reference numeral 2 designates an imaging plane thereof which is optically equivalent to a film surface. Provided in the vicinity of the imaging plane 2 is a condenser lens 3, and arranged thereafter are a pair of reimaging lenses 4 and 4' as well as one-dimensional image sensors 5 and 5'. The optical system has such a composition that an image of an object formed by the photographic lens 1 is reimaged on the image sensors 5 and 5' by the condenser lens 3 and the reimaging lenses 4 and 4'. In addition, the reference numeral 1A represents the exit pupil of the photographic lens 1, and the reference numeral 4A designates a stop having a pair of apertures and arranged before the reimaging lenses 4 and 4' at a location at which an image of the exit pupil 1A is to be formed by the condenser lens 3. In such a composition, images of the same object point are reimaged at points 5A and 5A' on the image sensors 5 and 5' when an image of an object is formed on the imaging plane 2 by the photographic lens 1. When the image of the object is formed on a plane deviated from the imaging plane 2, for example before the imaging plane 2 (on the side of the photographic lens) as indicated by the reference numeral 6, however, images of a point 6A and another point 6A' on the object are formed at the points 5A and 5A' of the image sensors 5 and 5' respectively, whereby an image of the same object point is not formed at the points 5A and 5A', and the images of the objects formed on the image sensors 5 and 5' are deviated upward and downward respectively as seen in the drawing. When an image of an object is formed after the imaging plane 2 (on the side of the image sensors), the upward and downward deviating directions of the images on the image sensors 5 and 5' are reversed. Therefore, it is possible to judge whether or not an image of an object is located on the imaging plane 2, i.e., focussed condition of an image, by detecting the relative positions of the images of an object formed on the two image sensors 5 and 5'. When the image is not in focussed condition, it is possible to judge deviating direction of the image, i.e., whether the image is formed before or after the imaging plane 2, and deviation degree of the image. At this time, deviation from the imaging plane 2 (defocussed degree) $\delta$ can be determined based on the triangulation principle by using, as the base length, distance 2D between two imaging optical paths 1 and $1_1'$ on the pupil plane of the photographic lens 1. Speaking concretely, a relationship of $L/D = \delta/h$ allows to obtain $\delta = (L/D) h$. Accordingly, it is possible to calculate the defocussed degree $\delta$ by determining h from the relative positional relationship between the images formed on the image sensors 5 and 5'.

On the other hand, photographing conditions are various since single lens reflex cameras permit exchanging various types of photographic lenses in practical use. Generally, large-aperture lenses having small F numbers have shallow focal depths and require high accuracy for focus detection, whereas small-aperture lenses having large F numbers do not require so high accuracy for focus detection. Further, when a lens having a very large F number is used, the two optical paths $l_1$ and $l_2$ are located outside the pupil of the photographic lens, thereby making it impossible to detect a focussed point.

SUMMARY OF THE INVENTION

A primary object of the present invention is to provide a focussed point detecting optical system permitting variation of focussed point detecting accuracy by varying base length in accordance with F numbers of different types of photographic lenses, and capable of detecting a focussed point even when a photographic lens having a very large F number is used.

According to the present invention, this object is attained by arranging, in the vicinity of the imaging plane of the objective lens of the focussed point detecting optical system, a variable refractive index optical element having a plane of symmetry including the optical axis of said objective lens and perpendicular to the straight line passing through the centers of a pair of reimaging lenses which are arranged on the side opposite to the objective lens at a location apart from said imaging plane.

In a preferred formation of the present invention, the variable refractive index optical element is composed as a liquid crystal prism comprising a transparent plane-parallel plate having a polarizing film bonded to the surface thereof on the side of the objective lens, a transparent base plate which is cemented to the plane-parallel plate on the surface thereof located on the side opposite to the objective lens with an electrically insulating spacer interposed and formed in which, on the side opposite to the objective lens, is a roof-shaped concavity having an edge on the plane including the optical axis of the objective lens and perpendicular to the straight line passing through the centers of a pair of reimaging lenses, a liquid crystal filled in the roof-shaped concavity and a power supply circuit for producing an electrical field in the liquid crystal chamber.

In another preferred formation of the present invention, the variable refractive index optical element is composed as a liquid crystal prism comprising a transparent plane-parallel plate having a polarizing film bonded to the surface thereof located on the side of the objective lens, a transparent base plate which is bonded to the plane-parallel plate on the surface thereof located on the side opposite to the objective lens with an electrically insulating spacer interposed and has a concavity consisting of a plural number of stripe-shaped oblique surfaces on the side opposite to the objective lens, a liquid crystal filled in the concavity and a power supply circuit for producing an electrical field in the liquid crystal chamber.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 3 is a sectional view illustrating an embodiment of the variable refractive index optical element to be used in the focussed point detecting optical system according to the present invention; and FIG. 4 is a sectional view illustrating another embodiment of the variable refractive index optical element to be used in the focussed point detecting optical system according to the present invention.

DESCRIPTION OF THE PREFERRED EMBODIMENTS

Figure 1:
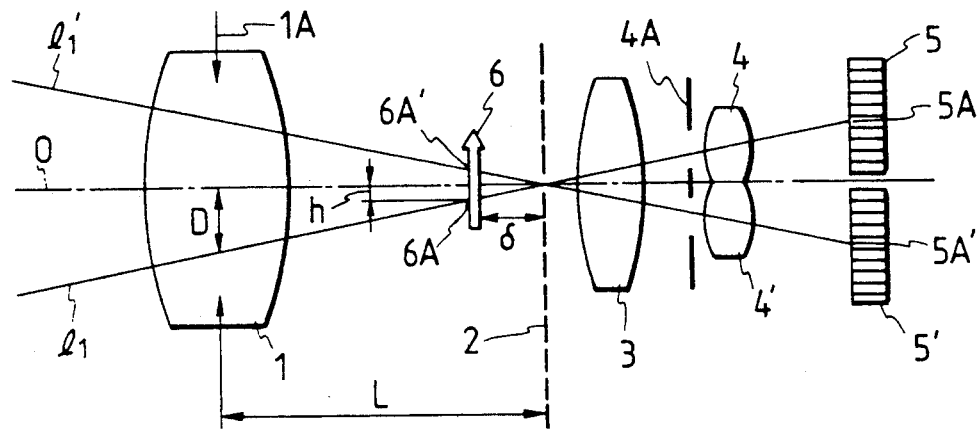
FIG. 1 is a sectional view illustrating the formation of the conventional focussed point detecting optical system.

Now, the present invention will be described detailedly below using the same reference numerals for the component members having the same functions as those described with reference to the prior art.

Figure 2:
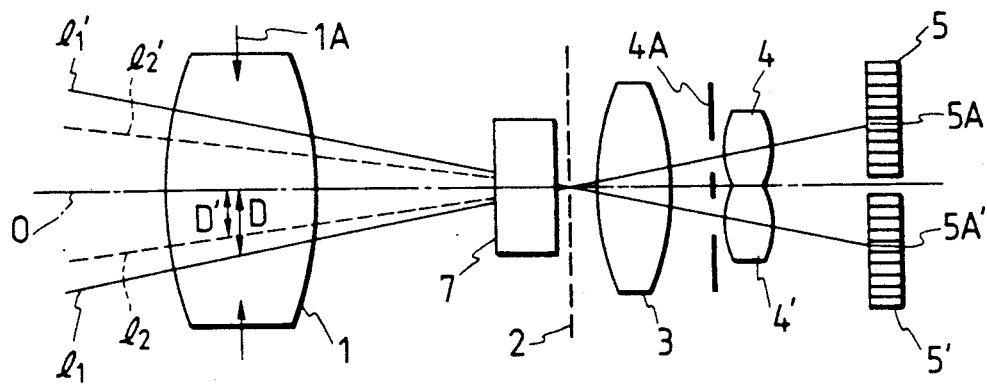
FIG. 2 is a sectional view illustrating fundamental formation of the focussed point detecting optical system according to the present invention.

According to the present invention, a variable refractive index optical element 7 which is symmetrical with regard to the plane including the optical axis of the photographic lens 1 and perpendicular to the paper surface is arranged in the vicinity of the imaging plane 2 of the photographic lens 1 and on the side of the photographic lens as illustrated in FIG. 2. In this formation, the lights passing along the optical paths indicated by the solid lines $1_1$ and $1_1'$ are incident on the points 5A and 5A' on the image sensors 5 and 5' when refractive index of the optical element 7 is set in a first condition, whereas the refracting function of the optical element 7 changes and the optical paths of the lights incident on the points 5A and 5A' of the image sensors are varied as indicated by the dashed lines $1_2$ and $1_2'$ respectively, i.e., symmetrically with regard to the optical axis of the photographic lens 1 when refractive index of the optical element 7 is changed to a second condition. This means that the base length is changed from D to D' in the triangulation system described above. Since D is longer than D' in this case, focussed point detecting accuracy is lowered in the second condition as compared with that in the first condition. However, light is not eclipsed and focussed point detection is not made impossible even when a photographic lens has a large F number or a stop aperture is narrowed. Moreover, in the first condition where the base length is long, focussed point can be detected with high accuracy for photographic lenses having large F numbers.

FIG. 3 is a sectional view showing an embodiment of the variable refractive index optical element 7 applicable to the present invention. In this drawing, a first transparent base plate 8 made, for example, of glass or plastic has a surface which is a plane perpendicular to the optical axis O of the photographic lens 1 (not shown) and another surface formed in which is a roof-shaped concavity 10 having a flat surface 9 left at the marginal portion thereof, including the optical axis O and having an edge on the plane perpendicular to the straight line passing through the centers of the pair of reimaging lenses 4 and 4' (i.e., on the plane including the opical axis O and perpendicular to the paper surface).

A transparent electrically conductive layer 11 is formed so as to cover the entire inside surface of the concavity 10 and further an orientation layer 12 is formed thereover. On the other hand, a second transparent base plate 13 has flat surfaces on both the sides. A polarizing film 14 is bonded to one of these surfaces, and a transparent electrically conductive layer 15 and an orientation layer 16 having a size corresponding to said concavity 10 are formed on the other surface. An empty chamber having an approximative form a trigonal prism is formed by cementing these two transparent base plates 8 and 13 to each other in such a direction that the orientation layers 12 and 16 have the same orientation and are opposed to each other with an electrically insulating spacer 17 interposed on the marginal portions of the base plates 8 and 13. A liquid crystal prism is formed by filling the chamber 10 with a nematic liquid crystal and by directing all liquid crystal directors to the direction determined by orientation treatment of the orientation layers 12 and 16. Illustrated in FIG. 3 are liquid crystal directors in a homogeneously oriented condition. The transparent electrically conductive layers 11 and 15 are connected through a switch 19 to a power supply 18 for generating alternating voltage.

When the oscillation plane of the light having passed through the polarizing film 14 is set in parallel to the direction of the liquid crystal directors, the liquid crystal prism has a refractive index of $n_e$ for the extraordinary light. Taking refractive index of the liquid crystal for the ordinary light and that of the transparent base plates an $n_o$ and $n_B$ respectively (the first and second transparent base plates being made of the same material), let us assume that a liquid crystal having $n_e > n_o$ and transparent base plates having $n_B = n_o$ are preliminarily selected. Since $n_e$ is larger than $n_B$ in this condition, lights are refracted in the directions to approach the optical axis O when passing from the liquid crystal prism to the transparent base plate 8. Accordingly, lights are incident as indicated by $1_2$ and $1_2'$.

When the switch 19 is turned on in this condition, a voltage is supplied to the liquid crystal prism and the liquid crystal directors change the direction thereof alone the direction of the electrical field. Accordingly, refractive index of the liquid crystal prism changes from $n_e$ to $n_o$. As a result, the lights are not refracted when passing from the liquid crystal prism to the transparent base plate 8, but are incident along the optical paths of $1_1$ and $1_1'$.

As is understood from the foregoing description, it is possible to perform the switching of the optical paths described with reference to FIG. 2 of change of the base length depending on whether or not a voltage is supplied to the liquid crystal prism.

In addition, since the location of the imaging plane 2 is a little deviated by changing refractive index of the liquid crystal prism from $n_e$ to $n_o$, it is more preferable to adjust the location at which photographic lenses are to be stopped by generating a correction signal representing the deviation when automatic focussed point detection is to be carried out with detection signals from a focussed point detector using the focussed point optical system according to the present invention.

FIG. 4 is a sectional view illustrating another embodiment of the variable refractive index optical element 7 applicable to the present invention. The component members which are not shown in this drawing are quite the same as those used in the Embodiment 1 described referring to FIG. 3. In the embodiment shown in FIG. 4, formed in the first transparent base plate 8 is a concavity 10' having a plural number of stripe-shaped oblique surfaces in place of the concavity 10 adopted in the Embodiment 1, and a liquid crystal is filled in a chamber formed between the concavity 10' and the second transparent base plate 13. This formation is suited to make the optical element thinner and design a compact focussed point detecting optical system since it enables to make very thin the liquid crystal layer in the liquid crystal prism. Further, a thinner liquid crystal layer is advantageous for enhancing light transmission ratio and, in addition, obtaining excellent response since such a liquid crystal layer remarkably shortens the time required for stabilizing refractive index at $n_o$ after the switch 19 is turned on.

When the transparent base plates are to be made of a plastic, it is preferable to select an acrylic resin rather than a polycarbonate resin since a material having a briefringence property as low as possible is advantageous. As for size of the spacer 17, it is practical to select a spacer having thickness on the order from several to twenty micrometers. Further, it is desirable for remarkably enhancing transmittance to design the liquid crystal prism so as to have such a shape as to limit thickness of the liquid crystal layer below 100 μm.

The orientation treatment for the orientation layer formed in the liquid crystal prism can be carried out by the well-known rubbing method or oblique evaporation coating of SiO. Especially when high accuracy is damanded for the orientation, for example, when variation of refractive index produced from location to location of the liquid crystal prism due to the pretilt of liquid crystal molecules is not ignorable, the orientation treatment should be performed symmetrically taking as a boader the plane including the edge of the concavity 10 or 10' and the optical axis O.

For the liquid crystal element, it is general to use an AC power supply voltage below 20 $V_{p-p}$ having a frequency on the order of 30 to several kilo Heltz. Though a power supply voltage is supplied to the liquid crystal prism by turning on the switch in the embodiments described above, it is possible to vary refractive index of the liquid crystal prism optionally and continuously between $n_e$ and $n_o$ by arranging a variable resistor as indicated by the dashed line in FIG. 3 so as to permit continuously varying the voltage applied between the transparent electrically conductive layers. This formation should be adopted when delicate voltage adjustment is required in accordance with photographic lenses to be focussed. When linearity in the relationship between light refraction by the liquid crystal prism and applied voltage is demanded, a linearity correcting circuit 20 should be added. Further, the function of the liquid crystal prism can be highly stabilized despite variation of ambient conditions by arranging a temperature compensating circuit 21 as occasion demands.

In addition, it is not always necessary to satisfy the relationship of $n_o=n_B$ though it is adopted in the embodiments described above. It is apparent that a variable refractive index optical element of the similar type can be composed by using a liquid crystal having a relationship of $n_o>n_e$.

Though the present invention has been described above taking application to cameras as an example, it is applicable also to the other kinds of optical instruments, especially optical instruments which use lens systems having pupils of various sizes.

Further, use of a variable refractive index optical element having the function of a lens in the present invention will bring about an advantage or capability to adjust position of the exit pupil.

Though no particular discussion is made on location of the pupil in the foregoing description, not only size of the exit pupil but also location thereof on the optical axis may be variable depending on types of photographic lenses. In such a case, images of the exit pupil of a photographic lens formed at a location deviated from the aperture stop arranged before the reimaging lenses and focussed point detecting accuracy may be degraded. If the variable refractive index optical element has the function of a lens in this case, it will be possible to form the images always at the location of the aperture stop despite the location of the exit pupil since focal length of the composite system consisting of the variable refractive index optical element and a condenser lens is varied in accordance with variation of refractive index. Concretely speaking, it is sufficient for this purpose to form the oblique surfaces coaxial with the optical axis (i.e., oblique surfaces like those on the Fresnel lens) in place, for example, of the stripe-shaped oblique surfaces formed on the liquid crystal prism perpendicular to the paper surface used in the embodiment illustrated in FIG. 4. In the case of the oblique surfaces coaxial with the optical axis, inclination angles of the oblique surfaces are minimized as they are farther from the optical axis.

When the variable refractive index optical element having no function of a lens is used, the base length and location of the images of the exit pupil are influenced at the same time by the variation of refractive index. When it is required to control the base length and location of the image independently, this requirement can be satisfied by arranged a variable refractive index optical element having no function of a lens and another variable refractive index optical element having the function of a lens sequentially along the optical axis (both the optical elements must be arranged in the vicinity of an image of an object), and varying refractive indices of the optical elements independently.

What is claimed is:

1. A focussed point detecting optical system for detecting a focussed condition of an image of an object formed by an imaging optical system having an exit pupil such that the exit pupil can take various positions on an optical axis, comprising:
   at least a pair of reimaging lenses arranged apart from an imaging plane of said imaging optical system on the side opposite to said imaging optical system;
   a stop having apertures individually corresponding to said pair of reimaging lenses, arranged adjacent to said pair of reimaging lenses; and
   a variable refractive index optical element which is symmetrical with respect to a plane including the optical axis of said imaging optical system, said plane being perpendicular to a straight line connecting the centers of said pair of reimaging lenses, and which is arranged adjacent to said imaging plane and retains a lens function,
   said variable refractive index optical element being varied in refractive index so that an image of said exit pupil is substantially formed at the position of said stop, irrespective of the various positions of said exit pupil.

2. A focussed point detecting optical system according to claim 1 wherein said variable refractive index optical element is a liquid crystal prism comprising a transparent plane-parallel plate having a polarizing film bonded to the surface thereof located on the side of said imaging optical system, a transparent base plate which is bonded to the surface of said plane-parallel plate on the side opposite to said imaging optical system with an electrically insulating spacer interposed, said transparent base plate being formed such that on the side facing said imaging optical system is a trigonal prism-shaped concavity having an edge on said plane-parallel plate, a liquid crystal filled in said trigonal prism-shaped concavity so as to form a liquid crystal chamber, and a power supply circuit for producing an electrical field in said liquid crystal chamber.

3. A focussed point detecting optical system according to claim 2 wherein said power supply circuit comprises an ON-OFF switch.

4. A focussed point detecting optical system according to claim 2 wherein said power supply circuit comprises a variable resistor for continuously varying a refractive index of said liquid crystal prism.

5. A focussed point detecting optical system according to claim 4 wherein said power supply circuit comprises a linearity correcting circuit for assuring linear variation of the refractive index of said liquid crystal prism relative to variation of applied voltage.

6. A focussed point detecting optical system according to claim 2 wherein said power supply circuit comprises a temperature compensation circuit for stabilizing the function of said liquid crystal prism.

7. A focussed point detecting optical system according to claim 1 wherein said variable refractive index optical element is a liquid crystal prism comprising a transparent plane-parallel plate having a polarizing film bonded to the surface thereof located on the side of said imaging optical system, a transparent base plate which is bonded to the surface of said plane-parallel plate located on the side opposite to said imaging optical system with an electrically insulating spacer interposed and, on the side facing said imaging optical system, said transparent base plate being formed with a concavity consisting of a plural number of stripe-shaped oblique surfaces, a liquid crystal filled in said concavity so as to form a liquid crystal chamber, and a power supply circuit for producing an electrical field in said liquid crystal chamber.

8. A focussed point detecting optical system according to claim 7 wherein said power supply circuit comprises an ON-OFF switch.

9. A focussed point detecting optical system according to claim 7 wherein said power supply circuit comprises a variable resistor for continuously varying a refractive index of said liquid crystal prism.

10. A focussed point detecting optical system according to claim 9 wherein said power supply circuit comprises a linearity correcting circuit for assuring linear variation of the refractive index of said liquid crystal prism relative to variation of applied voltage.

11. A focussed point detecting optical system according to claim 7 wherein said power supply circuit comprises a temperature compensation circuit for stabilizing the function of said liquid crystal prism.

12. A focussed point detecting optical system according to claim 7 wherein said plural number of stripe-shaped oblique surfaces are configured to be coaxial with the optical axis and inclination angles of the oblique surfaces are reduced progressively as the oblique surfaces are farther from the optical axis.

13. A focussed point detecting optical system for detecting a focussed condition of an image of an object formed by an imaging optical system having an exit pupil such that the exit pupil can take various positions on an optical axis, comprising:

at least a pair of reimaging lenses arranged apart from an imaging plane of said imaging optical system on the side opposite to said imaging optical system;

a stop having apertures individually corresponding to said pair of reimaging lenses, arranged adjacent to said pair of reimaging lenses; and a variable refractive index optical element which is symmetrical with respect to a plane including the optical axis of said imaging optical system, said plane being perpendicular to a straight line connecting the centers of said pair of reimaging lenses, and which is arranged adjacent to said imaging plane and retains a lens function, said variable refractive index optical element being varied in refractive index so that positions where two straight lines passing through individual centers of said pair of reimaging lenses, crossed on said imaging plane travel through said exit pupil, vary in accordance with size of said exit pupil.

14. A focussed point detecting optical system according to claim 1 or 13 wherein said imaging optical system is provided with a plural number of imaging lenses.

* * * * *